Jan. 1, 1974   A. G. PETZETAKIS   3,783,067
COMPOSITE SYNTHETIC-RESIN SHEET MATERIAL
Filed July 1, 1970
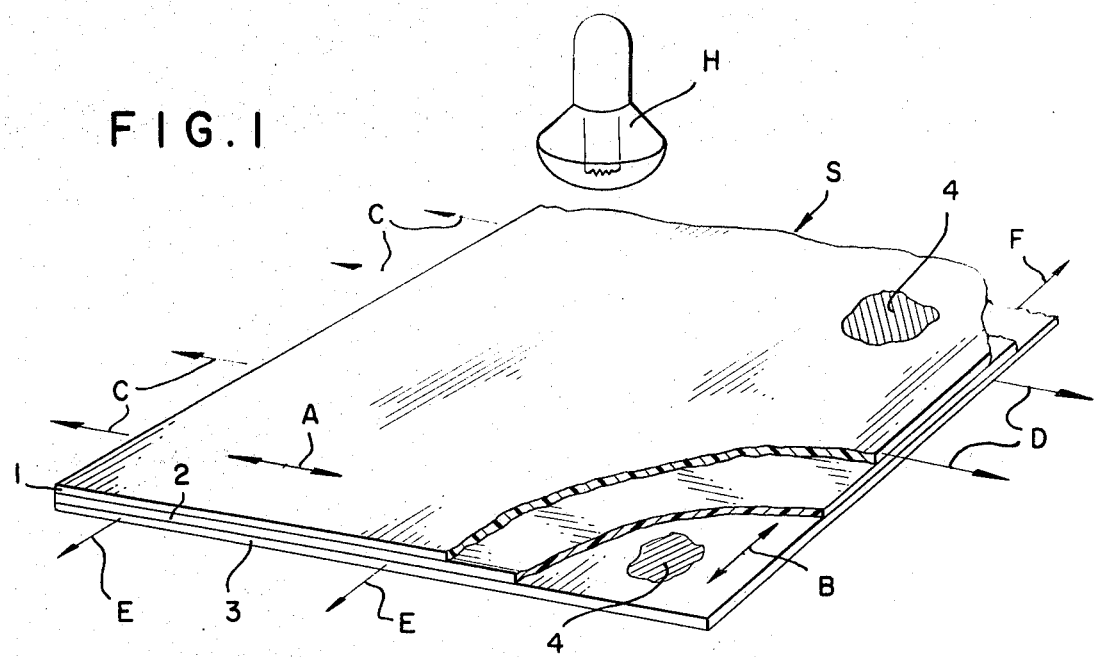
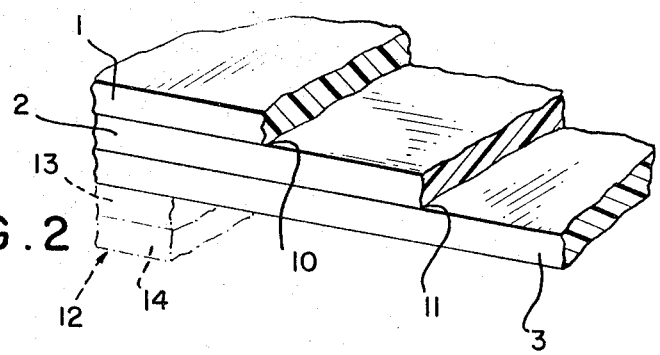
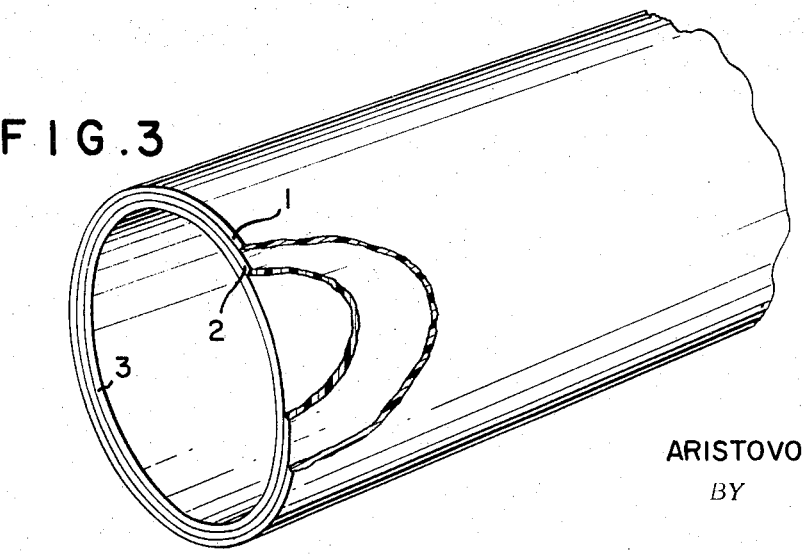
INVENTOR.
ARISTOVOULOS G. PETZETAKIS
BY
Karl J. Ross
ATTORNEY

United States Patent Office 3,783,067
Patented Jan. 1, 1974

3,783,067
COMPOSITE SYNTHETIC-RESIN SHEET
MATERIAL
Aristovoulos G. Petzetakis, Thessaloniki and Chandri Sts.,
Moschaton, Piraeus, Greece
Filed July 1, 1970, Ser. No. 51,554
Claims priority, application Greece, July 3, 1969,
40,473
Int. Cl. B32b 31/06, 31/08, 31/16
U.S. Cl. 156—163                                2 Claims

ABSTRACT OF THE DISCLOSURE

A method of making a sheet material which comprises sandwiching a molecularly unoriented synthetic-resin sheet having a relatively low molecular-disorientation temperature between a pair of uniaxially oriented synthetic-resin sheets having relatively high molecular-disorientation temperatures, arranging the orientation direction of one of the uniaxially-oriented sheets to lie at an angle (generally transversely) to the orientation direction of the other uniaxially-oriented sheet, and heating the laminated assembly to a temperature sufficient to fuse the nonoriented sheet to the molecularly oriented sheets, but below the molecular-disorientation temperature of the oriented sheets.

(1) FIELD OF THE INVENTION

The present invention relates to a composite synthetic-resin sheet material, particularly such a material usable in the construction of pressure-bearing elements, such as pipes.

(2) BACKGROUND OF THE INVENTION

Snythetic resins offer many advantages. They are relatively easy to form, cost little, resist corrosion, and deteriorate only slightly with time. The cheaper resins, however, have little strength. Polyvinyl chlorides and polyethylene, for example, cannot be used for many purposes due to their weakness.

It is known that many resins can be greatly strengthened by simultaneously heating and stretch to uniaxially orient their molecules. Such a method produces elongated pieces —usually sheets or bands—having great strength in the direction in which they were stretched, but being very weak transverse to that direction. Often the material will be twenty times stronger in its orientation direction than transverse thereto. Thus, threads or tapes so produced can be useful, but sheets so made are virtually worthless, since they are weaker in a direction transverse to the orientation direction than disoriented untreated sheets.

In another attempt to produce a synthetic-resin sheet material of increased strength, the above process has been applied, but the sheet is heated and stretched in two transverse directions. The results so obtained, however, are disappointing since no great increase in tensile strength is obtained in either direction, while the sheet so treated is more readily punctured.

By way of example, reference may be made to polyethylene sheets which may be classed as high-density polyethylene (HDP) and low-density polyethylene (LDP), as defined in Polyethylene, Kresser, Reinhold Publishing Corp., New York, 1957, the high-density polyethylene being a highly crystalline stereoregular molecularly oriented plastic while low-density polyethylene is generally considered nonoriented in the molecular sense. High-density polyethylene and low-density polyethylene differ, therefore, both with respect to the molecular structure and physical properties. High-density polyethylene reaches a molecular disorientation or crystallite-melting temperature of 127 to 131° C. and can be formed by stretching a polyethylene sheet at a temperature of 116 to 126° C. The fusion temperature of low-density polyethylene sheets, by contrast, may be 110 to 115° C. The advantages of using stereoregular or molecularly oriented polyethylene for objects which are subjected to stress have been discussed above.

It will be appreciated that molecular orientation may be either biaxial or monoaxial (unidirectional). In the latter case, the molecular orientation is in a single direction, whereas biaxial stereoregularity or molecular orientation is characterized by orientation in two directions which may be mutually perpendicular. It has been found that the manufacture of biaxial molecularly oriented sheets is prohibitively expensive and represents a compromise of the strength of the sheets in the direction of molecular orientation while the formation of laminated structures in which two monoaxially oriented sheets are co-extensively fused together is not a solution because the fusion destroys the molecular orientation which served as the basis for joining the sheets in the first place.

(3) OBJECTS OF THE INVENTION

It is, therefore, an important object of the present invention to provide an improved synthetic resin sheet material which has biaxial molecular-orientation characteristics, without the disadvantages of earlier laminate systems.

Another object of the invention is to provide an improved sheet material with high mechanical-strength characteristics without the difficulties encountered earlier.

It is also an object of the invention to provide an improved method of making a plastic body of high structural strength.

(4) SUMMARY OF THE INVENTION

These objects and others which will become apparent hereinafter are attained, in accordance with the present invention, by the formation of a sandwich-type laminate consisting of a pair of monoaxially oriented synthetic-resin sheets having relatively high molecular disorientation temperatures and an intermediate sheet, preferably of a nonoriented synthetic resin compatible with, or identical to, the synthetic resin of the molecularly oriented sheets, the molecularly oriented sheets being fused to the intervening sheet at the interface therewith. The present invention is based upon my discovery that it is possible to fuse a nonoriented thermoplastic sheet material to a molecularly oriented sheet material at the temperature corresponding to the fusion temperature or melting point of the nonmolecularly oriented sheet, but below the molecular disorientation temperature or melting point of the sheet material.

In general terms, therefore, the method of making a sheet material, of improved strength, in accordance with the present invention, comprises sandwiching a molecularly unoriented synthetic-resin sheet having a relatively low molecular-disorientation temperature between a pair of uniaxially oriented synthetic-resin sheets having relatively high molecular-disorientation temperatures; arranging the orientation direction of one of the uniaxially-oriented sheets to lie at an angle (generally transversely) to the orientation direction of the other uniaxially-oriented sheet; and heating the laminated assembly to a temperature sufficient to fuse the nonoriented sheet to the molecularly oriented sheets, but below the molecular-disorientation temperature of the oriented sheets.

Reference has been made above to the "molecular disorientation temperature" and it is intended to define this expression by the temperature at which a uniaxially or monoaxially (linearly) oriented thermoplastic synthetic resin of high crystallinity suffers a transition from the crystalline state to the amorphous or nonoriented state. In some cases the analogous temperature is referred to as the glass-transition temperature, this temperature lying below the melting point of the synthetic resin. Hence, it is inaccurate, for the purposes of the present invention, to refer to the melting point of the synthetic resin as the temperature below which the molecularly oriented sheets should be fused to the nonoriented sheet. It is more precise, therefore, to define a molecular-disorientation temperature at which the uniaxial or monoaxial orientation, giving the sheet the high strength in one direction, is disrupted. For the present purposes and in the case of polyethylene, the molecular-disorientation temperature corresponds to the crystallite melting temperature of 127 to 131° C. In any event, a temperature in the region of the melting point of a synthetic resin will suffice to disrupt the molecular orientation.

It is an important feature of the present invention that the molecularly oriented and nonoriented synthetic-resin sheets be compatible, i.e. that a bond close to the strength of the synthetic resin itself holds the two sheets together at each interface. Compatability can be insured if both sheets are composed, at least in major part, of the same synthetic resin, e.g. polyethylene. Furthermore, the three sheets of the present invention are substantially coextensive so that the interfacial bond between the nonoriented sheet and the oriented sheet is effected over the entire composite produced in accordance with the present invention.

The composite sheet material, in accordance with the article aspect of the present invention, thus may comprise two juxtaposed coextensive unilaterally oriented synthetic-resin sheets having relatively high molecular-disorientation temperatures and having molecular orientation directions lying at angles to one another, and a molecularly nonoriented synthetic-resin sheet having a fusion temperature below the molecular-disorientation temperatures of the oriented sheets and sandwiched between and thermally fused to the molecularly oriented sheets.

As applied, in its preferred case, to polyethylene, the invention comprises two layers of molecularly oriented, preferably highly crystalline, high-density polyethylene sandwiching between them a bonding layer of low-density polyethylene, the latter being fused to the layers of high-density polyethylene at thermally softened zones of the low-density polyethylene without thermal softening of the high-density polyethylene. Preferably, the layers of molecularly oriented high-density polyethylene have mutually transverse and preferably orthogonal molecular-orientation directions so that the composite sheet material can be used in structures which may be subjected to biaxial stress. In its practical forms, the composite sheet material, according to the invention, may be used as a multilayer foil, a multilayer plate, a tube coiled from a foil or plate, or a structure of any other configuration.

It has been found to be advantageous, moreover, to maintain the sheet material under tension in the molecular-orientation direction, during the application of heat to fuse the molecularly nonoriented sheet to the molecularly oriented layer.

The invention, therefore, is based on the surprising fact that molecularly oriented and especially highly crystalline high-density polyethylene does not lose its molecular orientation or the advantageous tensile-strength characteristics associated therewith when incorporated in a composite or laminate by fusion of the intervening low-density polyethylene layers is nevertheless of a strength sufficient to withstand separation and constitute the composite of a sheet material of greater strength in the directions of molecular orientation of the layers flanking the bonding layer, than a biaxially oriented sheet of the same thickness. This is especially the case when the bonding is effected while the high-density polyethylene sheets are maintained under tension.

(5) DESCRIPTION OF THE DRAWING

The above and other objects, features and advantages of the present invention will become more readily apparent from the following description and specific examples, reference being made to the accompanying drawing in which:

FIG. 1 is a perspective view greatly enlarged and partly in diagrammatic form of a composite sheet according to the present invention;

FIG. 2 is a detailed view thereof; and

FIG. 3 is a perspective view of a tube embodying the present invention.

(6) SPECIFIC DESCRIPTION

In FIG. 1, I show a composite sheet 5 constituted in accordance with the present invention. The sheet 5 comprises an upper layer 1 of molecularly oriented synthetic resin, i.e. uniaxial high-density polyethylene, preferably oriented in the direction of the arrow A, and a further sheet 3 of high-density polyethylene uniaxially (unidirectionally) oriented as represented by the arrow B. Between these layers, the thickness of which has been exaggerated, there is provided a bonding layer 2 of low-density polyethylene and of no molecular orientation. In accordance with the principles of the present invention, the three coextensive sheets are juxtaposed while the uniaxial orientation of the upper and lower sheets is maintained by tension applied at C and D in the direction of arrow A for the upper sheet 1 and, as represented by the arrows E and F, in the direction of the arrow B of the lower sheet 3 of FIG. 1. With the upper and lower sheets so tensioned, e.g. by frames, clamps or the like, the sheets are heated, e.g. by radiant heating as represented at H to a temperature (e.g. 116° to 126° C.) below the molecular disorientation temperature of sheets 1 and 3 but sufficient to fuse the three sheets together at the interface 10 and 11 represented in FIG. 2. In FIG. 2, it can be seen that the direction of molecular orientation (lines 4) of the sheets 1 and 3 need not be at right angles, as long as these directions are inclined one to the other. Furthermore, the composite may involve a greater number of layers as represented diagrammatically at 12 where the additional sheets include a further layer 13 of nonoriented material and a lower layer 14 of molecularly oriented synthetic resin whose orientation direction can be at an inclination to both directions of sheets 1 and 3 or may be parallel to that of sheet 1. The composite sheet built up in this fashion can be used for any purpose for which sheets, plates, foils and strips of synthetic resin has been used heretofore.

In FIG. 3, I have shown a pipe formed from the composite sheet and in which the layer 1 is shown to represent the outer foil while layers 2 and 3 lie successively inwardly and are coaxial with layer 1.

(7) SPECIFIC EXAMPLES

Example I

A composite of the type shown in FIG. 1 is made using highly oriented high-density polyethylene for sheets 1 and 3 and low-density polyethylene for sheet 2. The high-density polyethylene sheet is formed from polyethylene of a density of about 960 and is linearly and unidirectionally oriented in a conventional tensioning machine with a stretch ratio of 1:8 and at a temperature of about 120° C. The resulting polyethylene sheet has a thickness of 0.11 cm. and a tensile strength of about 4500 kg. per cm.² in the direction of orientation. The high-density polyethylene sheet may be of the type described in U.S. Pat. 3,196,195. The two high-density polyethylene sheets are provided with an intervening layer of low-density polyethylene having a melting point of about 110 to 115° C. and fusion is effected at 116° C. with the high-density polyethylene sheets under tension. The resulting composite has a thickness of about 0.33 cm. The composite is formed into a tube as shown in FIG. 3 with a diameter of 100 cm. (irrigation type) and is found to resist a bursting pressure of 20 atmospheres. Similar results were obtained according to a nonillustrated embodiment when the composite was formed by placing a first molecularly oriented sheet 3 among a cylindrical mandrel, then coiling a monoriented thermoplastic monofilament around the sheet to form a layer similar to that shown at 2 and thereafter place the outer oriented sheet 1 upon the composite and heating the resulting structure to effect fusion of the turns of the nonoriented monofilament with the oriented sheets and with one another.

Example II

The molecularly oriented sheets were composed of rigid polyvinyl chloride stretched in a ratio 1:3 and having a tensile strength of about 1500 kg. per cm.$^2$. Otherwise the parameters of Example I were used. The molecularly oriented rigid polyvinyl chloride is formed concurrently by the soft or plasticized polyvinyl chloride, the takeup roller being operated at different speeds to insure the stretch of the oriented rigid polyvinyl chloride whereupon the sheets are brought together at a temperature below the molecular disorientation temperature of the polyvinyl chloride layers.

The improvement described and illustrated is believed to admit of many modifications within the ability of persons skilled in the art, all such modifications being considered within the spirit and scope of the invention except as limited by the appended claims.

I claim:

1. A method of making a composite sheet material comprising the steps of:

sandwiching a molecularly nonoriented low-density polyethylene sheet having a relatively low molecular-disorientation temperature between a pair of stretched uniaxially oriented high-density polyethylene sheets having relatively high molecular disorientation temperatures and disposed with mutually crossing orientation directions, said uniaxially oriented sheet being in direct contact with said nonoriented sheet;

mechanically tensioning each of the high-density polyethylene uniaxially oriented sheets in the respective orientation direction;

heating the resulting stack of low-density and high-density polyethylene sheets while said high-density polyethylene uniaxially oriented sheets are mechanically maintained under tension to a temperature sufficient to melt the low-density polyethylene nonoriented sheet but insufficient to molecularly disorient the oriented sheets and thereby bonding said oriented sheets together solely by adhesion to said nonoriented sheet; and thereafter cooling the bonded stock.

2. The method of making a composite sheet material, comprising the steps of:

sandwiching a molecularly nonoriented low-density polyethylene sheet between and directly in contact with a pair of coextensive uniaxially molecularly oriented stretched high-density polyethylene sheets of mutually crossing directions of stretching and orientation;

mechanically tensioning each of said stretched oriented high-density polyethylene sheets in its respective orientation and stretched direction;

heating the resulting sandwich while mechanically maintaining the tension on each of said high-density polyethylene sheets to a temperature between 116° and 126° C. and at least equal to the melting point of said low-density polyethylene sheet to thermally fuse and bond the low-density polyethylene sheet to said high-density polyethylene sheets without molecularly disorienting the latter, thereby forming a bonded stack; and thereafter cooling the bonded stack.

References Cited

UNITED STATES PATENTS

| 2,429,177 | 10/1947 | Young | 156—164 |
|---|---|---|---|
| 2,594,229 | 4/1952 | Snyder et al. | 156—163 X |
| 3,380,868 | 4/1968 | Moser | 156—229 |
| 3,503,842 | 3/1970 | Kahn | 161—162 |
| 3,539,439 | 11/1970 | Calderwood et al. | 161—254 |
| 2,956,723 | 10/1960 | Tritsch | 161—247 |
| 3,049,466 | 8/1962 | Erlich | 161—252 X |
| 3,187,982 | 6/1965 | Underwood et al. | 161—252 X |
| 3,475,245 | 10/1969 | Bearer | 161—247 X |
| 3,508,944 | 4/1970 | Henderson et al. | 161—252 X |
| 3,540,979 | 11/1970 | Hughes | 161—252 |

FOREIGN PATENTS

| 1,094,480 | 12/1967 | Great Britain | 161—252 |
|---|---|---|---|

ALFRED L. LEAVITT, Primary Examiner

C. B. COSBY, Assistant Examiner

U.S. Cl. X.R.

156—162, 164, 229; 161—247, 252, 402